United States Patent [19]

Lambert et al.

[11] Patent Number: 5,158,111
[45] Date of Patent: Oct. 27, 1992

[54] PILOT VALVE FOR PNEUMATIC CONTROL SYSTEMS WITH IMPROVED POPPET

[75] Inventors: Floyd Lambert, Lafayette; Jack Skaggs, Bossier City, both of La.

[73] Assignee: Quality Machine & Supply, Inc., Lafayette, La.

[21] Appl. No.: 806,496

[22] Filed: Dec. 13, 1991

[51] Int. Cl.$^5$ .............................................. G05D 16/00
[52] U.S. Cl. .................................. 137/627.5; 251/333
[58] Field of Search ...................... 137/627.5; 251/333

[56] References Cited

U.S. PATENT DOCUMENTS

| | | | |
|---|---|---|---|
| 2,706,995 | 4/1955 | May | 137/627.5 X |
| 2,912,993 | 11/1959 | Jones . | |
| 3,052,254 | 9/1962 | Parks . | |
| 3,078,716 | 2/1963 | Winters . | |
| 3,127,189 | 3/1964 | Schultz et al. | 137/627.5 X |
| 3,228,731 | 1/1966 | Valentine | 137/627.5 UX |
| 3,457,949 | 7/1969 | Coulter | 251/333 X |
| 4,512,365 | 4/1985 | Jacobs et al. . | |
| 4,699,175 | 10/1987 | Anderson et al. . | |
| 4,875,502 | 10/1989 | Romano | 137/627.5 |

Primary Examiner—Robert G. Nilson
Attorney, Agent, or Firm—Charles D. Gunter, Jr.

[57] ABSTRACT

An improved mechanically actuated pilot valve is shown in which the output pressure from the valve is dependent upon a flapper position rather than upon force is applied to the flapper. The pilot valve has a valve body with a gas inlet chamber, a gas outlet chamber and an inner connecting gas passage for controlling the flow of gas through the valve. An improved poppet having primary and secondary sealing regions cooperates with a valve seat provided in the gas passage and with a hollow actuating stem which protrudes from the valve body to control the flow of control gas through the valve when the actuating stem is contacted by an external actuator, such as a flapper element.

8 Claims, 2 Drawing Sheets

PILOT VALVE FOR PNEUMATIC CONTROL SYSTEMS WITH IMPROVED POPPET

BACKGROUND OF THE INVENTION

1. Field of the Invention

The present invention relates generally to the pneumatic control of fluid process control valves and, specifically, to an improved mechanically actuated pilot valve for such pneumatic control systems.

2. Description of the Prior Art

The oil and gas, chemical and other industries routinely use pneumatically operated valves to regulate process levels and pressures in both lines and vessels. The controller for these valves generally contains a sensing element such as a Bourdon tube or a float mechanism. The sensing element responds to the process pressure or fluid level, providing mechanical movement to a "flapper" or other mechanical actuator element when a process change occurs.

In the case of controlling fluid level in a vessel, there exists in the control line of the discharge valve an open gas pilot which bleeds to the atmosphere. While the gas pilot is unobstructed the control line is at low pressure and the discharge valve is closed. There exists within the vessel a float. When the fluid level in the vessel rises the float also rises which causes a flapper element outside of the vessel to move. The flapper element moves to block the escape of control gas from the open pilot to the atmosphere, causing a rise in gas pressure in the control line. This rise in control gas pressure causes the pneumatic, diaphragm operated discharge valve to open, allowing fluid to escape from the vessel. In this manner, the level of fluid in the vessel is controlled.

The constant escape of the compressed control gas to the atmosphere from the open gas pilot is expensive and in the case of natural gas, poses significant environmental and safety risks. Therefore a need exists for a "non-bleed" pneumatic control pilot valve which reduces and/or restricts the flow of control gas to the atmosphere during the control operation. Such non-bleed pilot valves to date have relied on differential sealing surfaces and diaphragms or other dynamic seals to provide gas output based on force applied by the flapper element. The force necessary to operate these force-sensitive pilots causes the flapper element to become a "sprung" element in the control system. Additionally, the essentially unrestricted flow of gas through these pilots loads the internal members and gives unpredictable control response times. The resulting loading and unloading of the flapper element during operation of these pilots introduces undesirable and often unusable control responses to the process control valve.

The present invention has as its object to provide an improved, "non-bleed" pilot valve which responds to flapper position instead of applied flapper force.

Another object of the invention is to provide such an improved pilot valve with a mechanism which reduces the necessary actuating energy, thereby reducing the tendency of the flapper element to become "sprung" in the system being controlled.

Another object of the invention is to provide an improved pilot valve, the operation of which provides a normally restricted flow of gas through the valve, thereby resulting in smooth and predictable control responses.

SUMMARY OF THE INVENTION

The improved mechanically actuated pilot valve of the invention has a valve body which is adapted to be threaded or flanged to fit an existing controller as a retrofit, or as a component of a newly manufactured control unit. The body has a gas inlet chamber, including a port for the reception of control gas pressure. A restrictive orifice may be located within the gas inlet port to limit the rate at which control gas enters the gas inlet chamber. The gas inlet chamber communicates with a gas outlet chamber by means of an interconnecting gas passage. A poppet is located within the gas passage for controlling gas communication between the inlet and outlet chambers. The poppet has a primary seal region which, in the sealing position, separates the gas inlet chamber from the gas passage and, thus, the gas outlet chamber. The gas outlet chamber also has a port for the communication of gas pressure to the control line of a spring loaded process valve. The poppet extends through the gas passage into the gas outlet chamber. A secondary seal region on the poppet contacts the lower end of a hollow actuating stem extending within the gas outlet chamber.

The primary and secondary seal region are preferably generally convex in shape, but may assume alternative configurations to facilitate proper seal and gas flow rates depending upon the particular application. The seals are preferably constructed of a semi-rigid plastic or other suitable material.

An upper end of the hollow actuating stem protrudes through an upper body opening provided in the valve body and through a circumferential seal provided within the valve body to the exterior of the pilot valve. The circumferential seal configuration provides a low friction gas seal around the actuating stem, assuming a concave shape under pressure, thereby augmenting the seal.

The elements of the pilot valve cooperate so that when the hollow actuating stem is depressed, gas is allowed to flow at a controlled rate from the gas inlet chamber to the gas outlet chamber, thereby raising the pressure in the control line leading to the process valve. When the hollow actuating stem is released, there is a point at which both the primary and secondary seals of the poppet are both closed, thereby holding gas pressure in the control line but with no gas flow in the system. When the hollow actuating stem is further released, the poppet secondary seal region opens, allowing gas to escape to the atmosphere, thereby lowering the pressure in the control line. Only gas within the process line and pilot valve is released during the operational cycle of the pilot valve of the invention and only upon proper positioning of the internal components of the pilot valve.

Additional objects, features and advantages may be apparent in the written description which follows.

BRIEF DESCRIPTION OF THE DRAWINGS

FIG. 6 is a top view of the circumferential seal shown in FIG. 3a; and

DETAILED DESCRIPTION OF THE INVENTION

Figure 4:
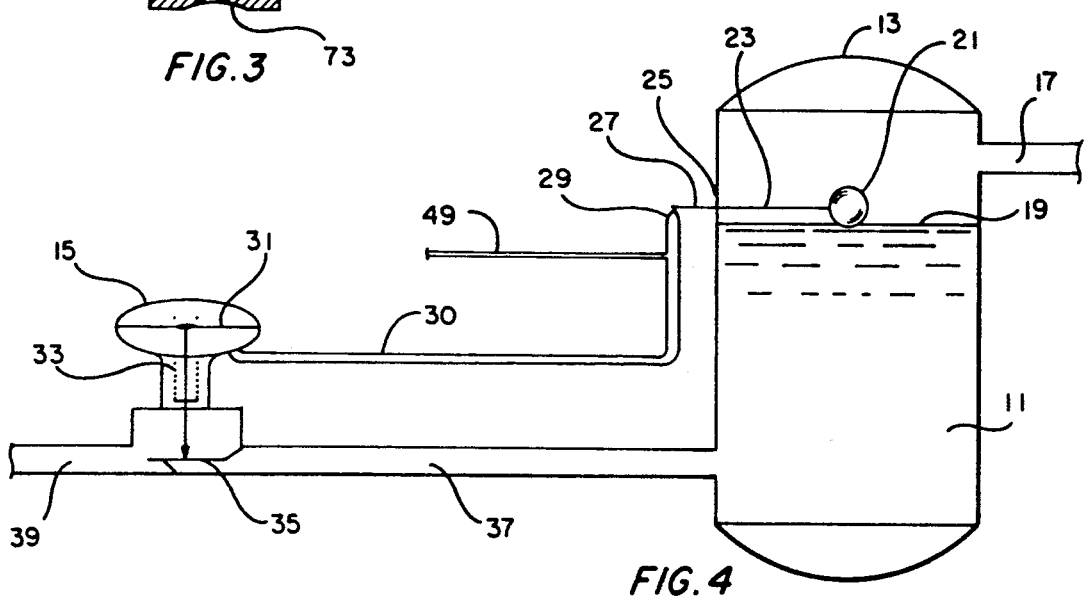
FIG. 4 is a simplified, schematic view of a prior art liquid level controller which utilized a tank float level to move an external flapper element which, in turn, controlled a spring loaded, pneumatically operated process control valve.

Turning first to FIG. 4, there is shown a simplified, schematic view of a prior art liquid level control system which utilizes a tank float 21 to move an external flapper element 27. The external flapper element 27 acts upon an open orifice 29 of an open gas pilot which bleeds to the atmosphere when the orifice is unobstructed.

In the control system illustrated in FIG. 4, control of the fluid level of the fluid 11 in the tank 13 is controlled by the pneumatically operated process valve 15. As fluid enters the tank through the liquid inlet 17, the tank level 19 increases. As the level 19 increases, the float 21 rises, causing the attached lever arm 23 to rotate about a fulcrum 25, thereby causing the external flapper element 27 to move downwardly in the direction of the orifice 29 of the bleeding, open gas pilot. The gas pilot 29 is supplied with control gas by means of supply gas line 49. This action blocks the exit of control gas to the atmosphere through the orifice 29. As this blockage occurs, there is a corresponding increase in pressure caused by the gas building up in the control line 30.

The increased pressure in the control line 30 acts upon the flexible diaphragm 31 of the process control valve 15, overcoming the closing action of spring 33 and thereby raising the attached valve stem 35 from its respective valve seat. This opens the process control valve 15, allowing fluid to flow from the tank outlet 37 to the liquid discharge line 39.

Figure 1:
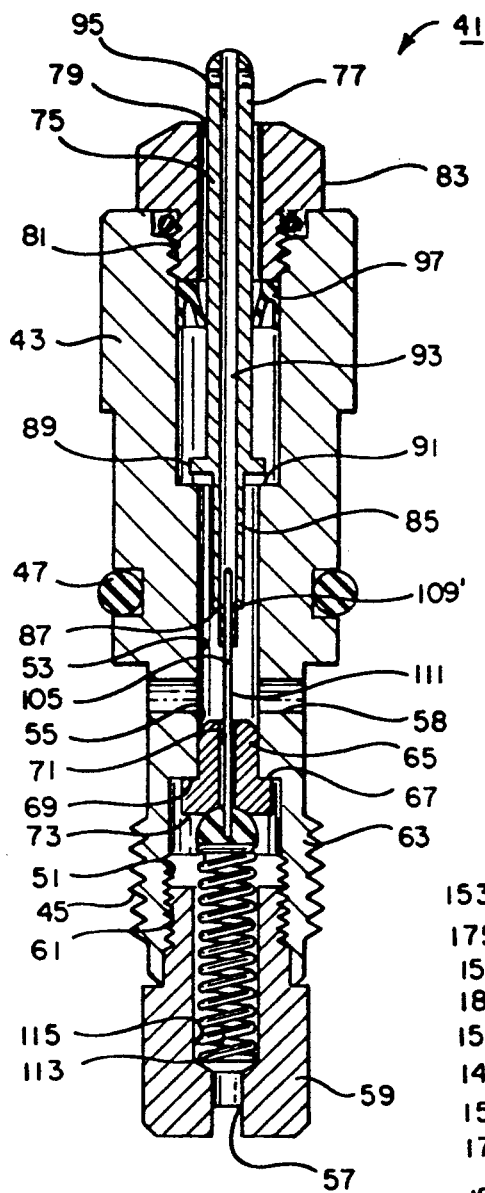
FIG. 1 is a side, cross-sectional view of one form of the improved, non-bleed pilot valve used in the method of the invention.

FIG. 1 shows the improved "non-bleed" pilot valve of the invention, designated generally as 41. The improved pilot valve 41 can be substituted for the bleeding open gas pilot, represented by orifice 29 in FIG. 4. The improved pilot valve 41 includes a valve body 43 having an externally threaded lower extent 45 for engagement within the body of the existing bleeding open gas pilot 29. Thread sealant provided on the lower extent 45 prevents leakage that would otherwise escape to the output or control line through port 58. An O-ring seal 47 prevents escape of control gas pressure to the atmosphere. The external configuration of the valve body 43 and its exact method of attachment may vary depending upon the mechanical requirements and configuration of the controller being installed or retrofitted with the pilot valve. For instance, the attachments may include flange type mounts, internal threads or external capturing devices. It is only necessary that a gas tight seal be provided between the pilot valve of the invention and the existing bleeding orifice to prevent unwanted escape of control gas.

As shown in FIG. 1, the valve body 43 includes a gas inlet chamber 51, a gas outlet chamber 53 and an interconnecting gas passage 55 for controlling gas communication between the inlet and outlet chambers. A port, such as restrictive orifice 57 is provided for supplying gas to the inlet chamber 51. The orifice 57 is provided within a base plug 59 which has an externally threaded upper extent 61 adapted to matingly engage internal threads provided within the valve body lower extent 63.

Figure 3:
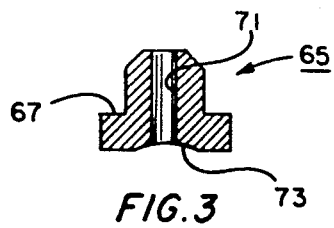
FIG. 3 is an isolated, cross-sectional view of the valve seat which is contacted by the primary seal region of the improved poppet utilized in the pilot valve of FIG. 1.

A stainless steel valve seat 65 (FIGS. 1 and 3) is associated with the gas passage 55 and comprises a primary sealing surface for separating the gas inlet chamber 51 from the gas passage 55 and thus the gas outlet chamber 53. In the embodiment shown, the valve seat 65 is a stepped member having an external step 67 for engaging an internal shoulder 69 provided within the valve body 43. The valve seat 65 also has a thru bore 71 which terminates in a concave internal taper 73 at the lower extent thereof, the taper being sized to form a gas tight seal upon contact with a mating convex surface. As will be explained further, the radius on the concave internal taper 73 is larger than the mating convex surface 107 of poppet 105. In the embodiment shown, the concave taper of the seat 73 has a radius valve of 0.250 inches. The seat is adapted to mate with a primary seal region 107 of the poppet, the region 107 having a radius value of 0.093 inches. The valve seat 65 can be retained within the valve body by frictional engagement or by threading or otherwise rigidly affixing the seat within the gas passage.

A hollow actuating stem 75 (FIG. 1) has an upper end 77 which protrudes at least partly through an upper body opening 79 provided in the valve body. In this case, the valve body 43 has an internally threaded upper extent 81 which engages the mating external threads of an end cap 83, the upper body opening 79 being provided in the end cap 83.

The hollow actuating stem 75 also has a lower end 85 which terminates in an end opening having a concave internal taper 87 which is sized to form a gas tight seal upon contact with a mating convex surface. The upper end 77 of the hollow actuating stem 75 is slightly larger in external diameter than the external diameter of the lower end 85 and the upper and lower ends are separated by a flange 89 which is arranged to seat upon an internal shoulder 91 provided within the valve body 43, thereby limiting the downward travel of the actuating stem 75 within the valve body. The actuating stem 75 has an interior bore 93 which runs from an exhaust port 95 in the stem upper end 77 to the lower end 85.

Figure 5:
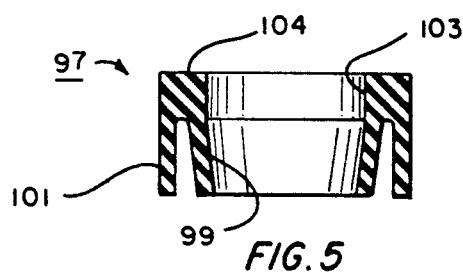
FIG. 5 is a side, cross-sectional view of the circumferential seal used within the gas outlet chamber of the improved pilot valve of FIG. 1.
Figure 6:
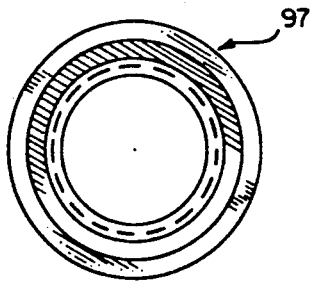

As shown in FIGS. 1, 5 and 6, the hollow actuating stem 75 protrudes through a circumferential seal 97 provided within the valve body 43. In the embodiment of FIG. 1, the circumferential seal 97 is located within the upper extent of the gas outlet chamber 53 and abuts the end cap 83. As best seen in FIG. 5, the circumferential seal 97 has an internal sealing lip 99 and an external sealing lip 101 which together form a cupped seal having a central opening 103. The circumferential seal 97 is formed of a pressure sensitive, flexible material, such as a suitable rubber. Under pressure, the seal 97 expands to cause the internal lip 99 to seal around the actuating stem 75 and to cause the seal end region 104 to seal against the end cap 83. The rubber material can be formulated, for example, from BUNA-N rubber which is compounded to resist oils, chemicals and various other contaminants.

The poppet 105 (FIGS. 1 and 7) is slidably arranged within the thru bore 71 of the valve seat 65. As discussed, the poppet first, radiussed convex surface 107, comprises a primary seal region, adapted to mate with the internally tapered sealing surface 73 of the valve seat 65. The second, radiussed convex surface 109, comprises a secondary seal region, which is adapted to mate with the internal taper 87 of the hollow actuating stem 75 to control the flow of gas through the gas passage 55 and, in turn, through the valve body 43.

Figure 7:
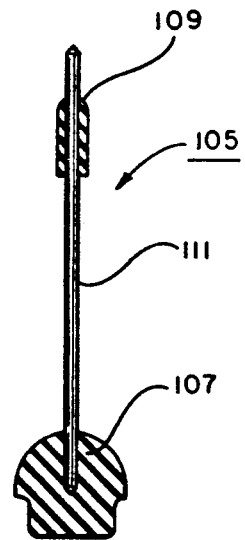
FIG. 7 is an isolated, perspective view of the improved poppet used in the pilot valve of FIG. 1.

As best seen in FIG. 7, the poppet first and second radiussed convex surfaces 107, 109 are separated by an elongate body portion 111 of generally uniform external diameter, the elongate body portion 111 being slidably received within the thru bore 71 of the valve seat 65. The convex surfaces 107, 109 can conveniently be molded of semi-rigid plastic or other suitable material. In the embodiment shown, the elongate body portion 111 is a stainless steel wire with plastic, machined-in-place seals forming the convex surfaces 107, 109. It will be understood that the assembly could also be manufactured as a one-piece construction, as by injection molding, thermoforming or other similar process.

Spring means such as coil spring 113 are located within the gas inlet chamber 51 for spring biasing the poppet 105 in the direction of the hollow actuating stem 75. As shown in FIG. 1, the coil spring 113 is received within a vertical bore 115 provided within the base plug 59.

As previously discussed, the external configuration of the pilot valve of the invention and its method of attachment may vary based upon the mechanical configuration of the controller being equipped or retrofitted. The mechanical actuator, referred to herein as "flapper" may also vary in configuration, as will be understood by those skilled in the art. For instance, instead of the lever arm and fulcrum illustrated in FIG. 4, the mechanical actuator can comprise a Bourdon tube controller such as that shown in U.S. Pat. No. 4,875,502, issued Oct. 24, 1989, and assigned to the assignee of the present invention, the disclosure of which is incorporated herein by reference.

Figure 2:
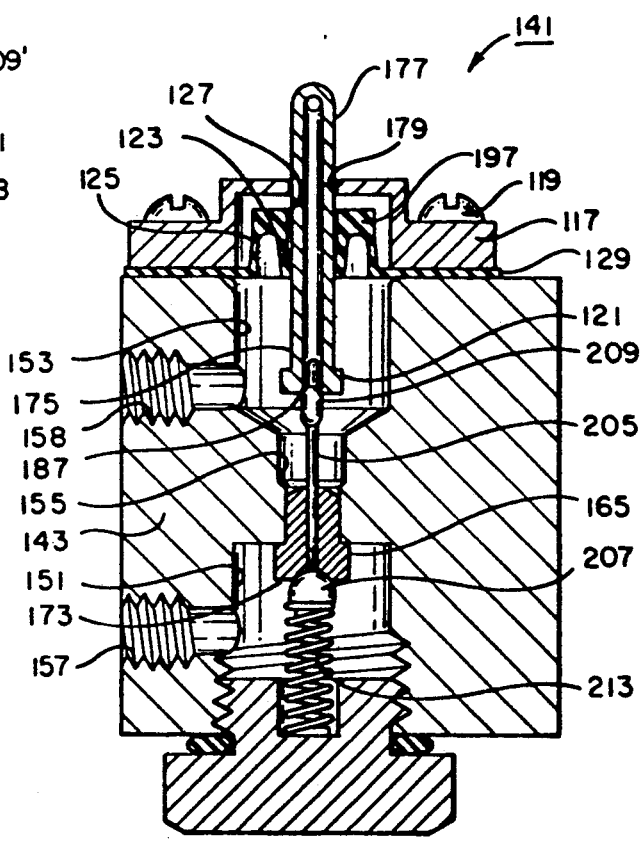
FIG. 2 is a side, cross-sectional view of another form of the improved, non-bleed pilot valve of the invention.

FIG. 2 shows another form of the improved pilot valve of the invention. The mechanically actuated pilot valve 141, shown in FIG. 2, features a valve body 143 with a gas inlet chamber 151, a gas outlet chamber 153 and an interconnecting gas passage 155. An inlet port 157 supplies control gas pressure to the inlet chamber 151 and an outlet port 158 supplies control gas to the control line leading to the process control valve. A valve seat 165 is provided with an internally tapered lower sealing surface 173 which is adapted to matingly engage the first radiussed convex surface 207 of the primary seal region provided on the poppet 205. The poppet 205 is again spring biased by means of coil spring 213.

The valve body 143 is provided with an upper cover plate 117 which is attached to the valve body by means of screws 119. The cover plate 117 includes an upper opening 179 through which the upper end 177 of the hollow actuating stem 175 protrudes. The hollow actuating stem 175 has a flanged lower extent 121 with an internally tapered end opening 187 for matingly engaging the second radiussed convex surface 209 of the secondary seal region provided on the poppet 205.

A circumferential seal 197 is again provided within the gas outlet chamber and has inner and outer circumferential wall portions 123, 125. A central opening 127 is provided for receiving the upper end 177 of the hollow actuating stem 175. In this case, a peripheral gasket region 129 is received between the upper cover plate 117 and the exterior of the valve body 143 to retain the circumferential seal in position.

The operation of the valve of FIG. 2 is identical to that of FIG. 1 and the operational description which follows will be made with reference to the pilot valve of FIG. 1. The non-bleed pilot valve of the invention is installed within the existing bleeding orifice 29 of the controller so that the flapper element 27 of the float 21 bears upon the hollow actuating stem 75 during the controlling operation. Control gas from the supply gas line 49 enters the gas inlet chamber 51 through the restrictive orifice 57. The gas outlet chamber 58 is arranged to communicate with the control line 30 by means of the gas passage 55.

Assuming that the fluid level is low in the tank 13, the flapper element 27 is above but not in contact with the hollow actuating stem 75. Under these conditions, the poppet 105 is spring biased upwardly, as viewed in FIG. 1 by the coil spring 113. This action causes a gas tight seal to be formed by the primary seal region convex surface 107 and the internally tapered sealing surface 73 of the valve seat 65. Additionally, actuating stem 75 is free to move upwardly, thereby disengaging the lower end 85 from the convex sealing surface 109 of the secondary seal region. This allows any gas pressure in the control line 30 to be vented to the atmosphere through the interior bore 93 of the actuating stem 75. Under these conditions, the valve stem 35 of the process control valve 15 (FIG. 4) is in the closed position, allowing the fluid level 19 in the tank 11 to rise.

As the fluid level in the tank rises, float 21 rises causing the flapper element 27 to contact the actuating stem 75 (FIG. 1). As this occurs, the actuating stem lower end 85 contacts the secondary sealing surface 109 of the poppet, creating a gas tight seal. The poppet 105 is then urged downwardly by the actuating stem 75 against the coil spring 113. This action opens the primary seal region formed between the convex surface 107 and the internally tapered surface 73 of the valve seat 65 and allows supply gas to flow from the inlet chamber, through the valve seat 65 and out the gas outlet port 58 into the control line 30. The process control valve 15 is then opened, as previously described, to allow fluid to flow from the tank 13 out the liquid discharge 39.

In the case of the non-bleed pilot valve of the invention, there exists a position of the flapper element 27 where both the primary and secondary seal regions are in contact and sealed with pressure trapped in the control line 30. Since the opening of the process control valve 15 is directly proportional to the pressure in the control line 30, and since the pressure in the control line 30 is directly proportional to the position of the flapper element 27, there exists some position of the float 21 and attached flapper element 27 which will permit fluid to exit the vessel at the same rate at which it enters. This describes a "throttling" action, whereby the fluid level in the tank is controlled within narrow limits.

During the previously described operation, the circumferential seal 97 and its internal sealing lip 99 contact the hollow actuating stem 75, thereby forming a low friction, gas tight seal. As pressure is introduced into the gas outlet chamber 53, pressure on the inner circumferential wall portion (99 in FIG. 5) of the circumferential seal causes the seal to bulge in concave fashion with a resulting squeezing action of the sealing lip 99 against the hollow actuating stem 75. This squeezing action causes the seal to remain gas tight with the amount of squeeze being proportional to the pressure accumulated in the gas outlet chamber 53. By varying the thickness and composition of the circumferential seal 97, it is possible to limit the squeezing action to that necessary to form a gas tight seal with a minimum friction between the hollow actuating stem 75 and the sealing lip 99.

The gas flow through the pilot valve of the invention can be additionally controlled by selectively sizing the restrictive orifice 57 (FIG. 2) to provide smooth and predictable control results. The size of the orifice 57 may vary depending upon the particular control requirements at hand.

An invention has been provided with several advantages. The various components of the pilot valve cooperate as described to prevent the escape of control gas to the atmosphere during the control process with the exception of that gas which is necessarily vented as a result of the control valve movement. The output of the pilot valve of the invention is dependant upon the position of the flapper element, rather than upon proportional areas of the seal elements or applied force of the flapper, making the valve well suited for use in control environments. By reducing the necessary actuating energy for operating the pilot valve, the tendency for the flapper element to become sprung is eliminated. The restricted flow of gas through the pilot valve of the invention provides smooth and predictable control responses.

While the invention has been shown in only two of its forms, it is not thus limited but is susceptible to various changes and modifications without departing from the spirit thereof.

What is claimed is:

1. An improved flapper actuated pilot valve in which the output pressure from the valve is dependent upon flapper position rather than upon applied flapper force, the improved pilot valve comprising:

a valve body having a gas inlet chamber, a gas outlet chamber and an interconnecting gas passage for controlling gas communication between the inlet and outlet chambers, the valve body also having an upper body opening;

a discreet valve seat installed in a stationary position within the gas passage, the valve seat having a thru bore and also being provided with an internally tapered sealing surface sized to form a gas tight seal upon contact with a mating convex surface;

a hollow actuating stem having an upper end which protrudes at least partly through the upper body opening and having a lower end with an internally tapered end opening sized to form a gas tight seal upon contact with a mating convex surface; and a poppet slidably arranged within the thru bore of the discreet valve seat, the poppet having a first, radiussed convex surface adapted to mate with the internally tapered sealing surface of the valve seat and having a second, radiussed convex surface adapted to mate with the internally tapered end opening of the hollow actuating stem to control the flow of gas through the gas passage and, in turn, through the valve body, the poppet having an elongate body portion of generally uniform external diameter which separates the first and second radiussed convex surfaces, the diameter of the elongate body portion being less than the diameter of each of the first and second radiussed convex surfaces and wherein the internally tapered sealing surface of the valve seat has a first radius of curvature and wherein the poppet first radiussed convex surface has a second radius of curvature, the first radius of curvature being greater than the second radius of curvature.

2. The improved flapper actuated pilot valve of claim 1, wherein a circumferential seal is provided in the valve body upper body opening, the circumferential seal having a central opening for receiving the upper end of the hollow actuating stem, the circumferential seal also having an internal sealing lip, and wherein the circumferential seal is formed of a pressure sensitive, flexible material, whereby an increase in gas pressure in the gas outlet chamber serves to change the geometric shape of the circumferential seal, thereby squeezing the internal sealing lip into tighter contact with the hollow actuating stem to form a gas tight seal in the gas outlet chamber.

3. The improved flapper actuated pilot valve of claim 1, wherein the first and second, radiussed convex surfaces are formed of a semi-rigid, plastic.

4. The improved flapper actuated pilot valve of claim 3, wherein spring means are located within the gas inlet chamber for spring biasing the poppet in the direction of the hollow actuating stem.

5. The improved flapper actuated pilot valve of claim 4, wherein the hollow actuating stem has an interior bore which runs from an exhaust port provided in the stem upper end to the internally tapered end opening provided in the stem lower end, the poppet second, radiussed convex surface serving to block the escape of control gas pressure when the second, radiussed convex surface contacts the internally tapered end opening of the hollow actuating stem.

6. The improved flapper actuated pilot valve of claim 5, wherein the circumferential seal provided within the valve body has inner and outer circumferential wall portions, which are spaced-apart to form a cupped seal, as viewed in cross-section, the inner circumferential wall portion defining the central opening for the hollow actuating stem, the inner circumferential wall portion also having an interior surface which comprises the sealing lip which contacts the hollow actuating stem during operation of the valve.

7. The improved flapper actuated pilot valve of claim 1, wherein the gas inlet chamber is provided with a restrictive orifice for supplying gas to the inlet chamber, the restrictive orifice being provided within a base plug which threadedly engages a port opening provided within the valve body.

8. The improved flapper actuated pilot valve of claim 1, wherein the first radius of curvature is about 0.250 inches and the second radius of curvature is about 0.093 inches.

* * * * *